US009957894B2

(12) United States Patent
Deibel et al.

(10) Patent No.: US 9,957,894 B2
(45) Date of Patent: May 1, 2018

(54) OUTER DIAMETER PLATFORM COOLING HOLE SYSTEM AND ASSEMBLY

(71) Applicant: United Technologies Corporation, Hartford, CT (US)

(72) Inventors: Russell Deibel, Glastonbury, CT (US); Matthew S. Gleiner, Norwalk, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 781 days.

(21) Appl. No.: 14/627,915

(22) Filed: Feb. 20, 2015

(65) Prior Publication Data

US 2016/0245093 A1 Aug. 25, 2016

(51) Int. Cl.

| | |
|---|---|
| ***F02C 7/12*** | (2006.01) |
| ***F02C 7/18*** | (2006.01) |
| ***F01D 9/04*** | (2006.01) |
| ***F01D 5/18*** | (2006.01) |

(52) U.S. Cl.

CPC ................ *F02C 7/18* (2013.01); *F01D 5/186* (2013.01); *F01D 9/041* (2013.01); *F05D 2240/81* (2013.01); *F05D 2260/202* (2013.01); *Y02T 50/676* (2013.01)

(58) Field of Classification Search

CPC . F01D 5/186; F01D 9/041; F02C 7/18; F05D 2240/81; F05D 2260/202; Y02T 50/676

USPC ......... 60/806; 415/115–116; 416/97 R, 96 R, 416/96 A, 95, 193 A

See application file for complete search history.

(56) References Cited

U.S. PATENT DOCUMENTS 5,382,135 A * 1/1995 Green .................... F01D 5/186 416/97 R
6,196,799 B1 * 3/2001 Fukue .................... F01D 5/186 416/97 R
7,695,247 B1 * 4/2010 Liang .................... F01D 5/186 416/97 R
8,707,712 B2 4/2014 Spangler et al.
2006/0056968 A1 * 3/2006 Jacala .................... F01D 5/186 416/97 R
2014/0000287 A1 * 1/2014 Spangler ............... Y02T 50/676 60/806

* cited by examiner

*Primary Examiner* — Theresa Trieu

(74) *Attorney, Agent, or Firm* — Snell & Wilmer, L.L.P.

(57) ABSTRACT

An airfoil component is described herein. The airfoil component may include an OD platform comprising a gaspath face and a non-gaspath face coupled together via a plurality of cooling holes. The airfoil component may include an airfoil extending in from the outer diameter platform. The plurality of cooling holes comprises a plurality of groups of cooling holes disposed in the outer diameter platform proximate a suction side of the airfoil and a pressure side of the airfoil.

19 Claims, 6 Drawing Sheets

OUTER DIAMETER PLATFORM COOLING HOLE SYSTEM AND ASSEMBLY

FIELD

This disclosure relates to a gas turbine engine, and more particularly to cooling hole arrangements on a first stage vane outer diameter (OD) platform.

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

A typical turbine section includes at least one array of stator vanes arranged circumferentially about an engine central longitudinal axis to define an outer radial flow path boundary for the hot combustion gases leaving the combustor section and entering the turbine section. Thus, the convex outer diameter of the vane is an area where the circumferential hotspot gas temperature is observed and is directly linked to thermal distress due to the hot combustion gases.

SUMMARY

According to various embodiments, an airfoil component is described herein. The airfoil component may include a platform, such as an outer diameter platform, comprising a gaspath and a non-gaspath face/surface. The airfoil component may include an airfoil extending from the OD platform. The plurality of cooling holes may comprise a plurality of groups of cooling holes disposed in the outer diameter platform proximate a suction side of the airfoil and a pressure side of the airfoil. A plenum may be formed adjacent to the non-gaspath face. The plurality of cooling holes may be coupled to the plenum.

According to various embodiments, the airfoil component may be a first stage turbine vane. A first group of the plurality of cooling holes may be disposed in the OD platform proximate the suction side. The first group of the plurality of cooling holes may comprise four cooling holes. A second group of the plurality of cooling holes may be disposed in the OD platform proximate the pressure side and near a leading edge of the airfoil. A second group of the plurality of cooling holes may comprise five cooling holes disposed within two rows. The two rows may be perpendicular to each other. A third group of the plurality of cooling holes may be disposed in the OD platform proximate the suction side and near a center of the airfoil. The third group of the plurality of cooling holes may comprise two cooling holes. A fourth group of the plurality of cooling holes may be disposed in the OD platform proximate the suction side and near a trailing edge of the airfoil. The fourth group of the plurality of cooling holes may comprise two cooling holes. A fifth group of the plurality of cooling holes may be disposed in the OD platform proximate a leading edge of the airfoil. The fifth group of the plurality of cooling holes may comprise three cooling holes. The plurality of cooling holes may be configured to eject coolant in a direction that film cools gaspath exposed surfaces of the OD platform. The plurality of cooling holes may be formed in substantial conformance with platform cooling hole locations described by the set of Cartesian coordinates set forth in Table 1.

According to various embodiments, a gas turbine engine comprises a compressor section, a combustor section and a turbine section including a plurality of airfoils, wherein each airfoil projects from an OD platform. The OD platform may comprise a gaspath and a non-gaspath surface. These surfaces may couple together via a plurality of cooling holes. The plurality of cooling holes may comprise a plurality of groups of cooling holes disposed in the OD platform proximate a suction side of the airfoil and a pressure side of the airfoil. The OD platform may comprise five groups of cooling holes. Two of the five groups of cooling holes may be disposed in the OD platform on the pressure side and proximate a leading edge of the airfoil. Three of the five groups of cooling holes are disposed in the OD platform proximate the suction side of the airfoil. A first group of cooling holes disposed in the OD platform on the suction side of the airfoil may be located proximate the leading edge of the airfoil. A second group of cooling holes disposed in the OD platform on the suction side of the airfoil may be located towards a middle section of the airfoil. A third group of cooling holes disposed in the OD platform on the suction side of the airfoil may be located proximate a trailing edge of the airfoil. The plurality of cooling holes may be formed in substantial conformance with the OD platform cooling hole locations described by the set of Cartesian coordinates set forth in Table 1.

According to various embodiments, an apparatus, including an outer diameter platform comprising: a non-gaspath face and a gaspath face coupled to the non-gaspath face via a plurality of cooling holes is disclosed. The apparatus may include an airfoil extending from the outer diameter platform. The plurality of cooling holes are formed in substantial conformance with platform cooling hole locations described by the set of Cartesian coordinates set forth in Table 1.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
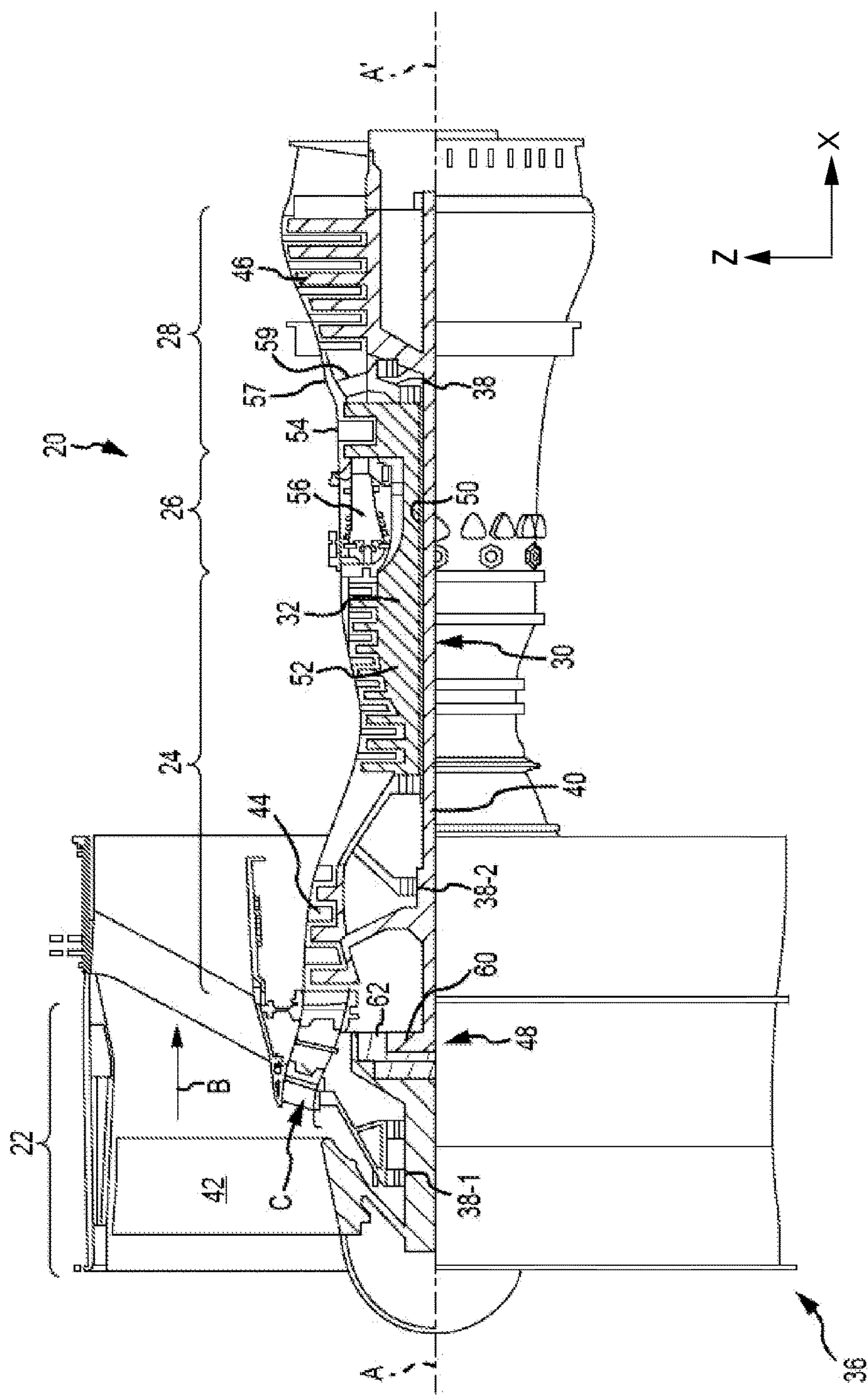
FIG. 1 illustrates an example gas turbine engine.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of gas turbine engines including three-spool architectures.

Figure 2:
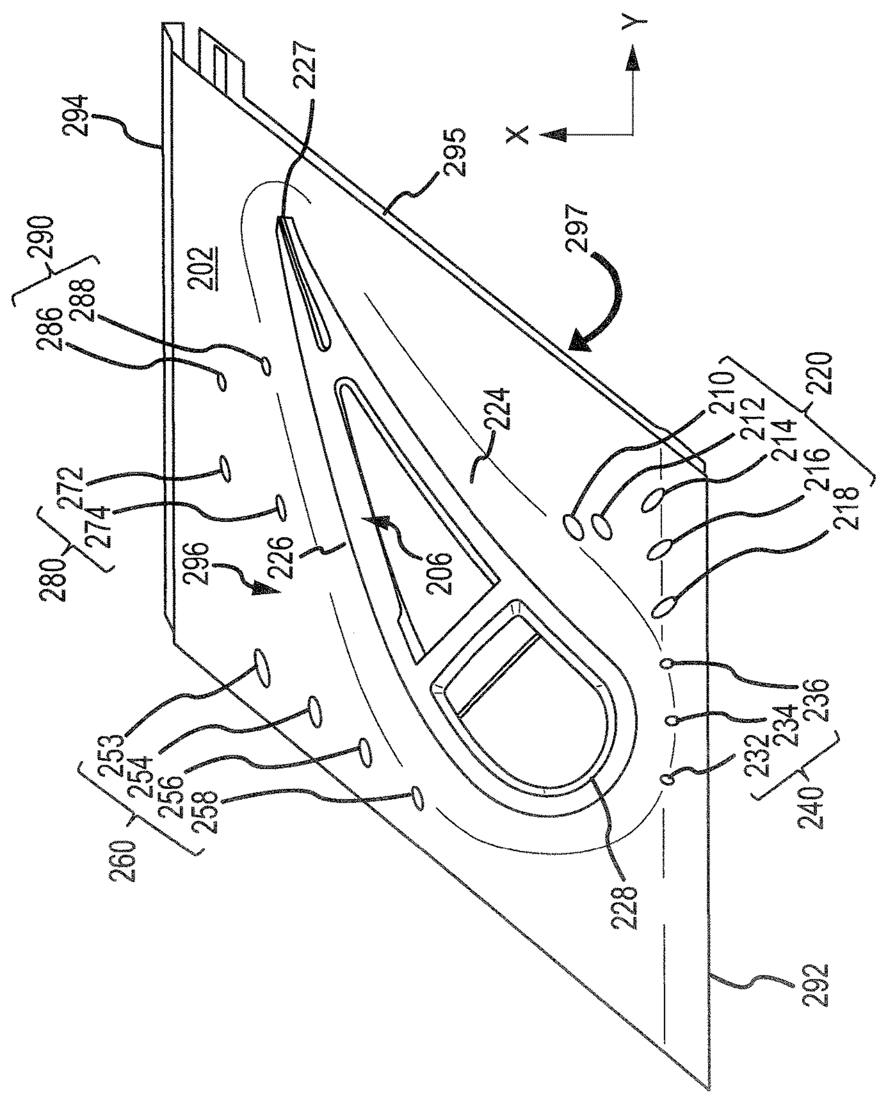
FIG. 2 illustrates an OD platform with cooling holes in accordance with various embodiments.

Gas turbine engine 20 may generally comprise a low speed spool 30 and a high speed spool 32 mounted for rotation about an engine central longitudinal axis A-A' via one or more bearing systems 38 (shown as bearing system 38-1 and bearing system 38-2 in FIG. 2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 (e.g., a second compressor section) and high pressure (or second) turbine section ("HPT") 54. A combustor 56 may be located between high pressure compressor 52 and HPT 54. A mid-turbine frame 57 may be located generally between HPT 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over HPT 54 and low pressure turbine 46. Mid-turbine frame 57 includes airfoils 59 which are in the core airflow path. Low pressure turbine 46 and HPT 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

Typically, vanes are cooled by communicating bleed air from the compressor section through a bypass duct and into the OD platform. This cooling air is then directed through cooling hole features to provide film cooling and internal convective cooling to reduce the vane operating metal temperature. Cooling hole placement design contributes to effective vane cooling. Accordingly, an efficient arrangement of cooling holes assists in increasing cooling effectiveness.

Figure 3:
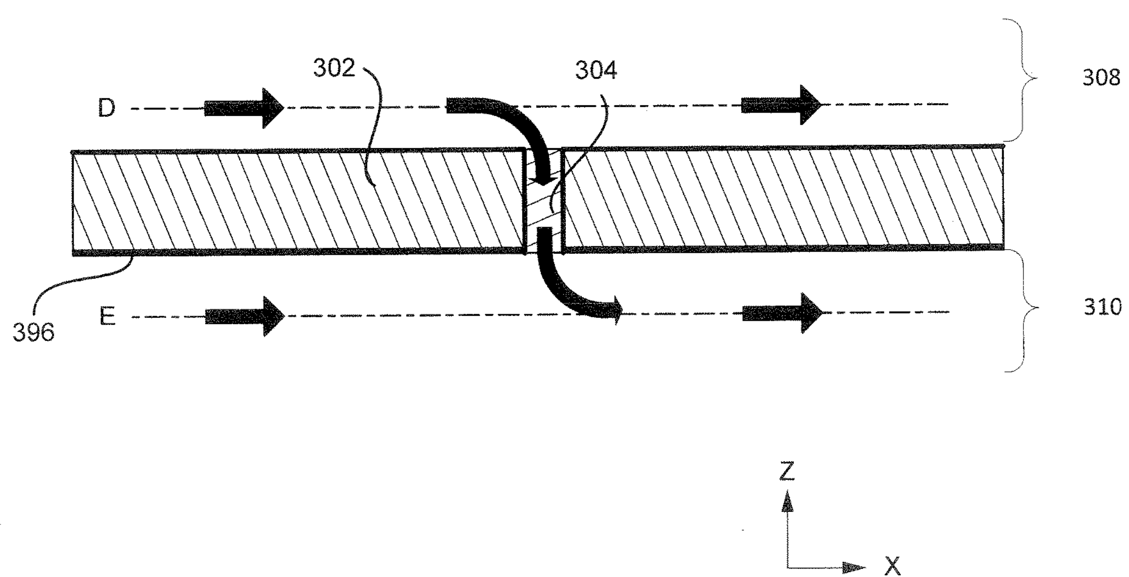
FIG. 3 illustrates an OD platform having a cooling hole normal to a surface.

In various embodiments, with reference to FIG. 2 and FIG. 3, and with continued reference to FIG. 1, an OD platform 202 is provided. FIG. 2 schematically illustrates a proximal view of a HPT 54 vane OD platform 202. The OD platform 202 is defined as having a forward face 292 and an aft face 294, as well as a non-gaspath face 297 and a gaspath face 296. The non-gaspath face 297 is located on the back side of the OD platform 202 and is spaced apart opposite of the gaspath face 296. The airfoil 206 extends inwardly from the OD platform 202.

An airfoil component, such as a vane, according to various embodiments, comprises an airfoil 206 that extends inwardly from the OD platform 202. The OD platform 202 includes at least one cooling hole connecting the gaspath face 296 and non-gaspath face 297 of the OD platform 202. The cooling holes may couple with a plenum 295. As used herein, face and surface, such as non-gaspath face and non-gaspath surface, may be used interchangeably.

In various embodiments and with reference to FIG. 2 and FIG. 3, the next generation of turbofan engines may be designed for higher efficiency which is associated with higher pressure ratios and higher temperatures in the HPT 54 (as shown in FIG. 1). Extreme operating temperatures and pressure ratios may create operating environments that may cause thermal loads that are higher than the thermal loads encountered in conventional turbofan engines, in particular the forward face 292 of the OD platform 202 located directly aft of the combustor section 26 (as shown in FIG. 1). Hot exhaust air "E" flows from the combustor section 26 to the forward face 292. Due to thermal fatigue, the vane is made of materials such as nickel-based superalloys to withstand extreme conditions. Cooling holes (220, 240, 260, 280, 290) may be disposed in the OD platform 202 configured to direct cooling air "D" from the non-gaspath side of the OD platform 202 to enter into the exhaust air flow "E" on the gaspath side of the OD platform 202 due to a favorable pressure gradient between the gaspath side and non-gaspath side of the OD platform 202, the non-gaspath side having greater pressure than the gaspath side. These cooling holes (220, 240, 260, 280, and 290) assist with decreasing the OD platform 202 metal temperatures through convection and/or film cooling.

The location of the cooling holes (220, 240, 260, 280, and 290) may be strategically placed. The strategic placement may include ejecting a coolant from a plurality of cooling holes (220, 240, 260, 280, and 290) in the OD platform 202 in a direction that provides film cooling to a gaspath face 296 of an airfoil component, such as a stator vane. Cooling holes 220 are located on the pressure side 224 of the OD platform 202 near the leading edge 228. According to various embodiments, the cooling holes 220 may have any desired shape and/or size. For instance, cooling holes may be round in shape with about a 0.017 inch (0.43 mm) diameter. Cooling holes 240 are located proximate the leading edge side 228 of the OD platform 202. Cooling holes 260 are located on the suction side 226 of the OD platform 202 near the leading edge 228 of the airfoil 206. Cooling holes 280 are located on the suction side 226 of the OD platform near the center/middle section of the airfoil 206. Cooling holes 290 are located on the suction side 226 of the airfoil near the trailing edge of the airfoil 206. The cooling holes (220, 240, 260, 280, 290) are not necessarily all the same diameter and may vary in size, shape and flow direction orientation.

According to various embodiments and with renewed reference to FIG. 2, cooling holes 220 may comprise cooling holes 210, 212, 214, 216, and 218. Cooling holes 240 may comprise cooling holes 232, 234, and 236. Cooling holes 260 may comprise cooling holes 253, 254, 256, and 258. Cooling holes 280 may comprise cooling holes 272, and 274. Cooling holes 290 may comprise cooling holes 286, and 288.

Cooling holes 220 may comprise a plurality of rows of holes, (e.g., cooling holes 210 and 212 may comprise a first row and cooling holes 214, 216 and 218 may comprise a second row. The first row and second row of cooling holes 220 may each be non-parallel rows. For instance, the first row and second row of cooling holes 220 may be substantially perpendicular to each other. Cooling holes 240 may be located closer to the leading edge 228 of the airfoil 206 as compared with cooling holes 220. Cooling hole 258 may be positioned closer to the airfoil 206 than the position of adjacent cooling hole 256. The position of cooling holes 290 may be closer to the trailing edge of the airfoil 206 as compared with the position of cooling holes 280. Cooling hole 274 may be positioned closer to the airfoil 206 than the position of adjacent cooling hole 272. Cooling hole 288 may be positioned closer to the airfoil 206 than the position of adjacent cooling hole 286.

Figure 4:
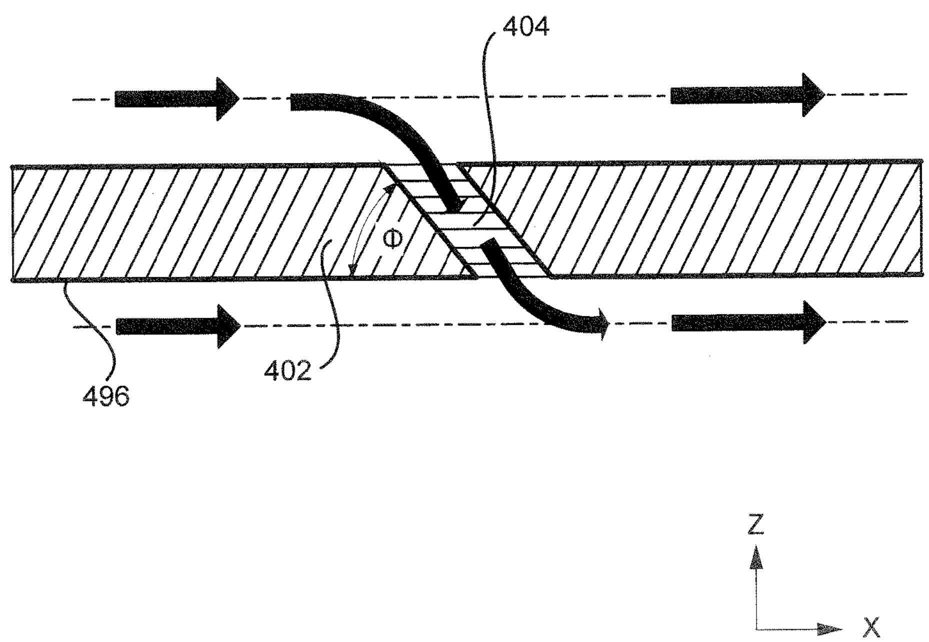
FIG. 4 illustrates an OD platform having a cooling hole angled from a surface.

In various embodiments and with reference to FIG. 2 and FIG. 3, the size and shape of cooling holes (220, 240, 260, 280, and 290) may vary. Cooling holes (220, 240, 260, 280, and 290) can be any variation of circular, ovular, rectangular, triangular, or any other shape in cross section. With reference to FIG. 3, cooling hole 304, which may be any cooling hole (220, 240, 260, 280, 290), can be situated normal to the OD platform 302 gaspath face 396. Cooling air travels along path "D" in the aft direction through the bypass duct 308 and can enter into cooling hole 304 and enter into the gaspath "E" section to cool the airfoil component, such as a vane. With reference to FIG. 4, cooling hole 404, which may be any cooling hole (220, 240, 260, 280, and 290), may be situated at an angle Φ to the OD platform 402 gaspath face 496. The angle Φ at which cooling hole 404 is oriented may be any desired angle such as an angle varying between 18 and 40 degrees.

The method of creating the cooling holes (220, 240, 260, 280, and 290) can include any method of drilling, boring, or cutting as well as any other method known to persons of ordinary skill in the art. According to various embodiments, cooling holes (220, 240, 260, 280, and 290) are formed via laser drilled holes.

Figure 5:
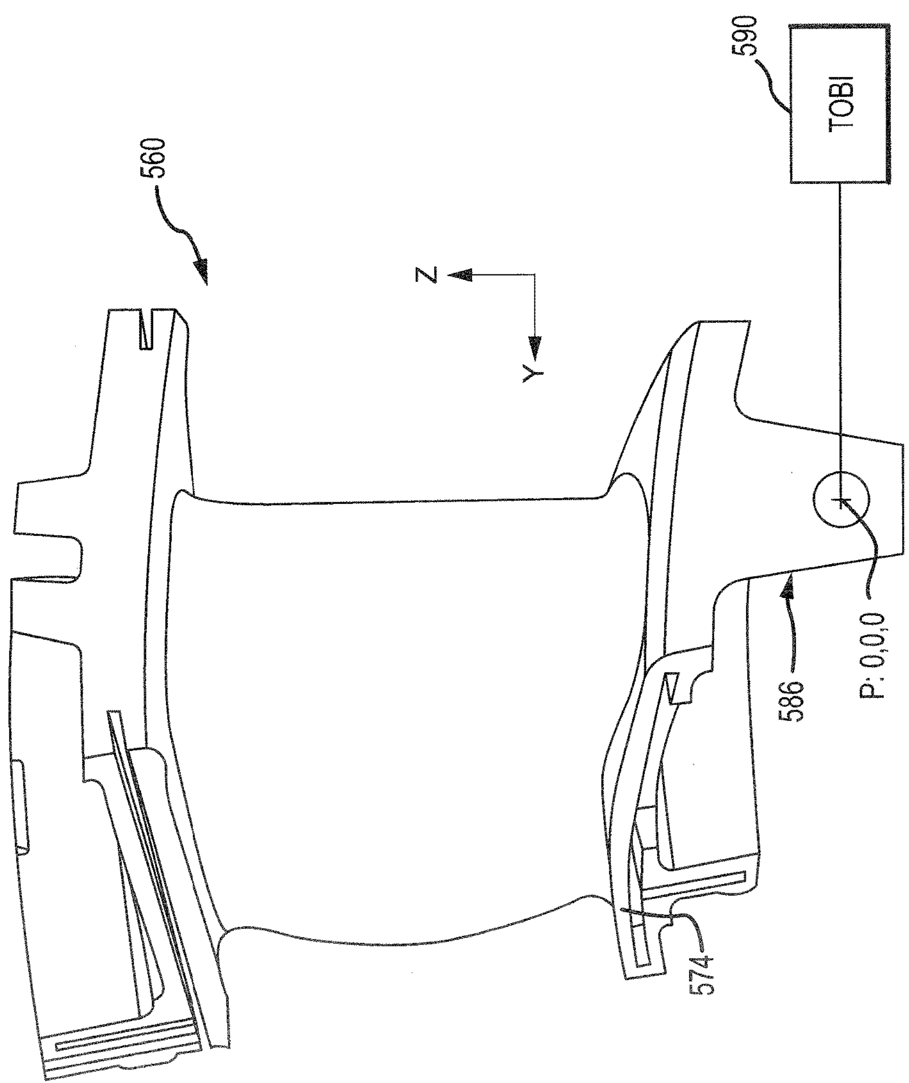
FIG. 5 illustrates a perspective view of a turbine vane for a high pressure turbine section.

In various embodiments and with reference to FIG. 5, the ID platform 574 includes a radially inwardly extending tab 586 providing a tangential on-board injector (TOBI) pin hole that is used to fasten the vane 560 to a TOBI 590. The center of the TOBI pin hole corresponds to a point P, which provides the reference zero-coordinate for the vane cooling holes.

Figure 6:
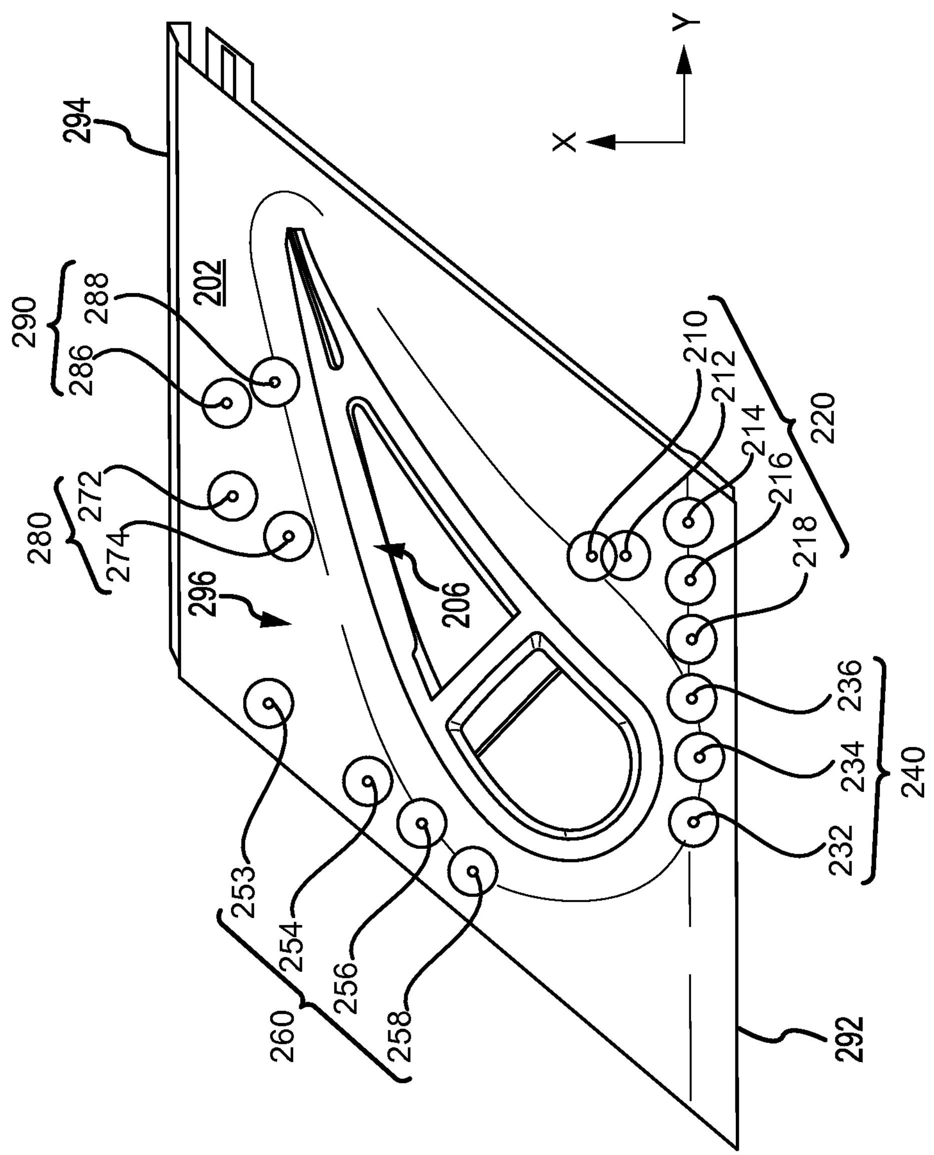
FIG. 6 illustrates a schematic view of a cooling hole layout in accordance with various embodiments.

In various embodiments the OD platform 202 includes cooling holes that are shown in FIG. 6. The cooling holes each include a diameter and/or footprint (where the holes break the surface of the OD platform 202) of 0.010-0.035 inch (0.25-0.89 mm), in one example. Generally, the cooling holes are directed away from the airfoil 206 and from the leading edge 292 toward the trailing edge 294. The angle of the cooling holes relative to the OD platform 202 surface may be any desired angle such as between about 10° to 45°, in one example. The locations of the cooling holes are described in terms of Cartesian coordinates defined along x, y and z axes, which respectively correspond to the axial (x), circumferential (y) and radial (z) directions shown in the Figures. The locations of the OD platform 202 cooling holes correspond to the centerline of holes where the holes break the surface of the platform. The coordinates of the cooling holes are respectively set forth in Table 1 (in inches), which provide the nominal axial (x), circumferential (y) and radial (z) coordinates relative to the point P on a cold, uncoated, stationary vane. Each row in Table 1 corresponds to a cooling hole location. The coordinates can be converted to metric (mm) by multiplying by 25.4, or could be converted to any other units. A fillet is provided between the airfoil 206 and the OD platform 202. The half of the fillet adjacent to each platform is generally considered to be a part of OD platform 202.

TABLE 1

| Hole No. | X | Y | Z |
|---|---|---|---|
| 212 | 0.406 | 0.808 | 2.493 |
| 214 | 0.278 | 0.884 | 2.504 |
| 216 | 0.263 | 0.747 | 2.508 |
| 218 | 0.250 | 0.597 | 2.510 |
| 232 | 0.237 | 0.138 | 2.500 |
| 234 | 0.222 | 0.292 | 2.509 |
| 236 | 0.237 | 0.450 | 2.510 |
| 253 | 1.326 | 0.440 | 2.347 |
| 254 | 1.187 | 0.324 | 2.356 |
| 256 | 1.050 | 0.209 | 2.377 |
| 258 | 0.913 | 0.094 | 2.394 |
| 272 | 1.424 | 0.982 | 2.341 |

TABLE 1-continued

| Hole No. | X | Y | Z |
|---|---|---|---|
| 274 | 1.274 | 0.875 | 2.344 |
| 286 | 1.431 | 1.217 | 2.327 |
| 288 | 1.313 | 1.250 | 2.321 |

The coordinates define break out points (illustrated in FIG. 6 as the center of small circles) of the cooling holes on a cold, uncoated, stationary vane. Additional elements such as additional cooling holes, protective coatings, fillets and seal structures may also be formed onto the specified platform surface, or onto an adjacent airfoil surface, but these elements are not necessarily described by the coordinates.

Due to manufacturing tolerances, the external breakout of the centerline of the hole can fall within a 0.200 inch (5.08 mm) diameter circle inscribed on the surface of the part. The tolerances about the cooling holes 220, 240, 260, 280, 290 are schematically illustrated by the circles circumscribing the cooling holes. However, the edge-to-edge spacing between adjacent cooling holes of at least 0.015 inch (0.381 mm) must be maintained. Additionally, the cooling holes are also located within the OD platform 202 regardless of the tolerance. These tolerances are generally constant or not scalable, and apply to the specified platform surface, regardless of size.

Substantial conformance is based on points representing the cooling hole locations, for example in inches or millimeters, as determined by selecting particular values of the scaling parameters. A substantially conforming airfoil, blade or vane structure has cooling holes that conform to the specified sets of points, within the specified tolerance.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade or vane, or that the part or structure is sufficiently the same with respect to a part design in a type-certified or type-certificated airfoil, blade or vane, such that the part or structure complies with airworthiness standards applicable to the specified blade, vane or airfoil. In particular, substantial conformance encompasses any regulatory determination that a particular part or structure is sufficiently similar to, identical to, or the same as a specified blade, vane or airfoil, such that certification or authorization for use is based at least in part on the determination of similarity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil component comprising:

an outer diameter platform comprising:

a non-gaspath face;

a gaspath face coupled to the non-gaspath face via a plurality of cooling holes; and an airfoil extending from the outer diameter platform, wherein the plurality of cooling holes comprise a plurality of groups of cooling holes disposed in the outer diameter platfortii proximate a suction side of the airfoil and a pressure side of the airfoil, wherein a plenum is formed adjacent to the non-gaspath face, wherein the plurality of cooling holes are coupled to the plenum;

wherein a second group of the plurality of cooling holes is disposed in the outer diameter platform proximate the pressure side and near a leading edge of the airfoil, wherein the second group of the plurality of cooling holes has five cooling holes disposed within two rows.

2. The airfoil component of claim 1, wherein the airfoil component is a first stage turbine vane.

3. The airfoil component of claim 1, wherein a first group of the plurality of cooling holes is disposed in the outer diameter platform proximate the suction side.

4. The airfoil component of claim 3, wherein the first group of the plurality of cooling holes has four cooling holes.

5. The airfoil component of claim 1, wherein the two rows are perpendicular to each other.

6. The airfoil component of claim 1, wherein a third group of the plurality of cooling holes is disposed in the outer diameter platform proximate the suction side and near a center of the airfoil.

7. The airfoil component of claim 6, wherein the third group of the plurality of cooling holes has two cooling holes.

8. The airfoil component of claim 1, wherein a fourth group of the plurality of cooling holes is disposed in the outer diameter platform proximate the suction side and near a trailing edge of the airfoil.

9. The airfoil component of claim 8, wherein the fourth group of the plurality of cooling holes has two cooling holes.

10. The airfoil component of claim 1, wherein a fifth group of the plurality of cooling holes is disposed in the outer diameter platform proximate a leading edge of the airfoil.

11. The airfoil component of claim 10, wherein the fifth group of the plurality of cooling holes has three cooling holes.

12. The airfoil component of claim 1, wherein the plurality of cooling holes are configured to eject coolant in a direction that film cools gaspath exposed surfaces of the outer diameter platform.

13. The airfoil component of claim 1, wherein the plurality of cooling holes are formed in substantial conformance with outer diameter platform cooling hole locations, wherein the locations of the cooling holes are described in terms of Cartesian coordinates defined by along x, y, and z axes and the coordinates of the cooling holes are:

| Hole No. | X | Y | Z |
|---|---|---|---|
| First Hole | 0.406 | 0.808 | 2.493 |
| Second Hole | 0.278 | 0.884 | 2.504 |
| Third Hole | 0.263 | 0.747 | 2.508 |
| Fourth Hole | 0.250 | 0.597 | 2.510 |
| Fifth Hole | 0.237 | 0.138 | 2.500 |
| Sixth Hole | 0.222 | 0.292 | 2.509 |
| Seventh Hole | 0.237 | 0.450 | 2.510 |
| Eighth Hole | 1.326 | 0.440 | 2.347 |
| Ninth Hole | 1.187 | 0.324 | 2.356 |
| Tenth Hole | 1.050 | 0.209 | 2.377 |
| Eleventh Hole | 0.913 | 0.094 | 2.394 |
| Twelfth Hole | 1.424 | 0.982 | 2.341 |
| Thirteenth Hole | 1.274 | 0.875 | 2.344 |
| Fourteenth Hole | 1.431 | 1.217 | 2.327 |
| Fifteenth Hole | 1.313 | 1.250 | 2.321. |

14. A gas turbine engine comprising:

a compressor section;

a combustor section; and a turbine section including a plurality of airfoils, wherein each airfoil projects from an outer diameter platform; the outer diameter platform comprising:

a non-gaspath face; and a gaspath face coupled to the non-gaspath face via a plurality of cooling holes, wherein the plurality of cooling holes comprise a plurality of groups of cooling holes disposed in the outer diameter platform proximate a suction side of a vane and a pressure side of the vane:

wherein a second group of the plurality of cooling holes is disposed in the outer diameter platform proximate the pressure side and near a leading edge of the airfoil, wherein the second group of the plurality of cooling holes has five cooling holes disposed within two rows.

15. The gas turbine engine of claim 14, further comprising five groups of cooling holes.

16. The gas turbine engine of claim 15, wherein two of the five groups of cooling holes are disposed in the outer diameter platform on the pressure side and proximate a leading edge of the airfoil, wherein three of the five groups of cooling holes are disposed in the outer diameter platform proximate the suction side of the airfoil, wherein a first group of cooling holes disposed in the outer diameter platform on the suction side of the airfoil is located proximate the leading edge of the airfoil, wherein a second group of cooling holes disposed in outer diameter platform on the suction side of the airfoil is located towards a middle section of the airfoil, and wherein a third group of cooling holes disposed in the outer diameter platform on the suction side of the airfoil are located proximate a trailing edge of the airfoil.

17. The gas turbine engine of claim 14, wherein the plurality of cooling holes are formed in substantial conformance with outer diameter platform cooling hole locations, wherein the locations of the cooling holes are described in terms of Cartesian coordinates defined by along x, y, and z axes and the coordinates of the cooling holes are:

| Hole No. | X | Y | Z |
|---|---|---|---|
| First Hole | 0.406 | 0.808 | 2.493 |
| Second Hole | 0.278 | 0.884 | 2.504 |
| Third Hole | 0.263 | 0.747 | 2.508 |
| Fourth Hole | 0.250 | 0.597 | 2.510 |
| Fifth Hole | 0.237 | 0.138 | 2.500 |
| Sixth Hole | 0.222 | 0.292 | 2.509 |
| Seventh Hole | 0.237 | 0.450 | 2.510 |
| Eighth Hole | 1.326 | 0.440 | 2.347 |
| Ninth Hole | 1.187 | 0.324 | 2.356 |
| Tenth Hole | 1.050 | 0.209 | 2.377 |
| Eleventh Hole | 0.913 | 0.094 | 2.394 |
| Twelfth Hole | 1.424 | 0.982 | 2.341 |
| Thirteenth Hole | 1.274 | 0.875 | 2.344 |
| Fourteenth Hole | 1.431 | 1.217 | 2.327 |
| Fifteenth Hole | 1.313 | 1.250 | 2.321. |

18. An apparatus, comprising:

an outer diameter platform comprising:

a non-gaspath face; and a gaspath face coupled to the non-gaspath face via a plurality of cooling holes; and an airfoil extending from the outer diameter platform, wherein the plurality of cooling holes are formed in substantial conformance with platform cooling hole locations, wherein the locations of the cooling holes are described in terms of Cartesian coordinates defined by along x, y, and z axes and the coordinates of the cooling holes are:

| Hole No. | X | Y | Z |
|---|---|---|---|
| First Hole | 0.406 | 0.808 | 2.493 |
| Second Hole | 0.278 | 0.884 | 2.504 |
| Third Hole | 0.263 | 0.747 | 2.508 |
| Fourth Hole | 0.250 | 0.597 | 2.510 |
| Fifth Hole | 0.237 | 0.138 | 2.500 |
| Sixth Hole | 0.222 | 0.292 | 2.509 |
| Seventh Hole | 0.237 | 0.450 | 2.510 |
| Eighth Hole | 1.326 | 0.440 | 2.347 |
| Ninth Hole | 1.187 | 0.324 | 2.356 |
| Tenth Hole | 1.050 | 0.209 | 2.377 |
| Eleventh Hole | 0.913 | 0.094 | 2.394 |

-continued

| Hole No. | X | Y | Z |
|---|---|---|---|
| Twelfth Hole | 1.424 | 0.982 | 7.341 |
| Thirteenth Hole | 1.274 | 0.875 | 2.344 |
| Fourteenth Hole | 1.431 | 1.217 | 2.327 |
| Fifteenth Hole | 1.313 | 1.250 | 2.321. |

19. The apparatus of claim 18, wherein the plurality of cooling holes comprise a plurality of groups of cooling holes disposed in the outer diameter platform proximate a suction side of a vane and a pressure side of the vane; wherein a second group of the plurality of cooling holes is disposed in the outer diameter platform proximate the pressure side and near a leading edge of the airfoil, wherein the second group of the plurality of cooling holes has five cooling holes disposed within two rows.

* * * * *

UNITED STATES PATENT AND TRADEMARK OFFICE

CERTIFICATE OF CORRECTION

PATENT NO. : 9,957,894 B2
APPLICATION NO. : 14/627915
DATED : May 1, 2018
INVENTOR(S) : Russell Deibel and Matthew S Gleiner It is certified that error appears in the above-identified patent and that said Letters Patent is hereby corrected as shown below:

In the Claims

In Column 8, Line 51 delete "platfortii" and insert therefore -- platform --
In Column 11, Line 5 delete "7.341" and insert therefore -- 2.341 --

Signed and Sealed this
Twenty-first Day of August, 2018

Andrei Iancu
*Director of the United States Patent and Trademark Office*